(12) United States Patent
Duan et al.

(10) Patent No.: US 10,282,691 B2
(45) Date of Patent: *May 7, 2019

(54) DATABASE PARTITION

(71) Applicant: INTERNATIONAL BUSINESS MACHINES CORPORATION, Armonk, NY (US)

(72) Inventors: Ning Duan, Beijing (CN); Chun Hua Tian, Beijing (CN); Ji Zheng Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 14/722,378

(22) Filed: May 27, 2015

(65) Prior Publication Data

US 2015/0347473 A1    Dec. 3, 2015

(30) Foreign Application Priority Data

May 29, 2014  (CN) .......................... 2014 1 0234362

(51) Int. Cl.
*G06F 17/30* (2006.01)
*G06Q 10/06* (2012.01)

(52) U.S. Cl.
CPC ... *G06Q 10/0633* (2013.01); *G06F 17/30294* (2013.01); *G06F 17/30324* (2013.01); *G06F 17/30339* (2013.01); *G06F 17/30584* (2013.01); *G06F 17/30604* (2013.01); *G06F 17/30221* (2013.01); *G06F 17/30961* (2013.01)

(58) Field of Classification Search
CPC ......... G06F 17/30584; G06F 17/30294; G06F 17/30324; G06F 17/30604; G06F 17/30961; G06F 17/30221
USPC .......................... 707/798, 600, 648, 809, 968
See application file for complete search history.

(56) References Cited

U.S. PATENT DOCUMENTS 6,976,212 B2 * 12/2005 Newman ............... G06F 17/211
                                                      345/619
7,366,716 B2 *  4/2008 Agrawal ........... G06F 17/30584
                                                      707/999.002

(Continued)

FOREIGN PATENT DOCUMENTS

DE         60035432 T2    6/2008

OTHER PUBLICATIONS

List of IBM Patents or Patent Applications Treated as Related; .: Date Filed: May 25, 2015, pp. 1-2.

(Continued)

*Primary Examiner* — Dangelino N Gortayo
(74) *Attorney, Agent, or Firm* — Cantor Colburn LLP; David Quinn (57) ABSTRACT

A method for partitioning a database includes obtaining business dependency between data in a plurality of tables in the database on the basis of a business process associated with the database; generating, on the basis of the business dependency, a dependency graph describing a dependency relationship between the plurality of tables; cutting the dependency graph into at least two sub-graphs; and vertically partitioning the database into at least two parts corresponding to the at least two sub-graphs respectively.

19 Claims, 10 Drawing Sheets

(56) References Cited

U.S. PATENT DOCUMENTS

| | | | | |
|---|---|---|---|---|
| 8,095,006 | B2* | 1/2012 | Ansari | H04B 10/272 398/68 |
| 8,237,716 | B2* | 8/2012 | Kolipaka | G06T 11/206 345/419 |
| 8,577,842 | B1* | 11/2013 | Nagargadde | G06F 11/1464 707/639 |
| 8,689,231 | B2* | 4/2014 | Milnor | G06F 9/4881 717/106 |
| 8,904,381 | B2* | 12/2014 | Chen | G06F 17/30339 707/968 |
| 8,924,945 | B1* | 12/2014 | Wright | G06F 8/433 717/132 |
| 9,031,994 | B1* | 5/2015 | Cao | G06F 17/30958 707/798 |
| 9,563,486 | B1* | 2/2017 | Narsude | G06F 17/30569 |
| 9,589,382 | B2* | 3/2017 | Wilson | G06T 13/00 |
| 2007/0162903 | A1* | 7/2007 | Babb, II | G06F 8/75 717/154 |
| 2009/0259618 | A1* | 10/2009 | Shi | G06F 17/3051 |
| 2010/0138442 | A1 | 6/2010 | Shinkawa et al. | |
| 2013/0097183 | A1* | 4/2013 | McCracken | G06F 11/0709 707/748 |
| 2013/0166589 | A1 | 6/2013 | Baeumges et al. | |
| 2013/0166606 | A1 | 6/2013 | Fricke et al. | |
| 2015/0294026 | A1* | 10/2015 | Iskander | G06F 17/30958 707/798 |
| 2015/0370883 | A1* | 12/2015 | Kalki | H04L 63/10 707/600 |
| 2015/0379064 | A1* | 12/2015 | Xin | G06F 17/30371 707/687 |

OTHER PUBLICATIONS

Ning Duan, et al., "Database Partition," U.S. Appl. No. 14/747,310, filed Jun. 23, 2015.

A.Jindal et al., "Relax and let the database do the partitioning online," Enabling Real-Time Buiness Intelligence, Lecture Notes in Business Information Processing, vol. 126, 2012, pp. 1-27.

Database Journal, [Online]; [retrieved on Mar. 13, 2014]; retrieved from Internethttp://www.databasejournal.com/features/oracle/article.php/3900241/Oracle-Database-11g-New-Features-for-Table-Partitioning.htmK. Reliford., Ran Out of Space Fix IDS.

H. Baer, "Partitioning in Oracle Database 11g," Oracle Corporation, An Oracle White Paper, Jun. 2007, pp. 1-13.

J.Rao et al., "Automating physical database design in a parallel database," Proceedings of the ACM SIGMOD international conference on Management of data, Jun. 3-6, 2002, pp. 1-12.

Chinese First Office Action dated Mar. 2, 2018 cited in Application No. 201410234362.7, 21 pgs.

Li Shupan, "Design of Relational Database Automatic Partition Method", College of Computer and Information Technology, Nanyang Normal University, Computer CD software and applications, Sep. 2014, 1 pg.

Ke Jia et al., "Detection of complexity video event based on hypergraph model," Application Research of Computers, vol. 29, No. 12, Dec. 2012, 5 pgs.

* cited by examiner

DATABASE PARTITION

FOREIGN PRIORITY

This application claims priority to Chinese Patent Application No. 201410234362.7, filed May 29, 2014, and all the benefits accruing therefrom under 35 U.S.C. § 119, the contents of which in its entirety are herein incorporated by reference.

BACKGROUND

Various embodiments of the present invention relate to databases, and more specifically, to a method and apparatus for partitioning a database.

With the development of database technology, databases are widely applied in various respects of people's work and life. Further, with the complication of business processes associated with databases, a database might include dozens of and even more tables. If all these tables are stored in the same data node, then phenomena such as lengthy response time and even outages because of excess accesses and so on, might occur to this data node.

To solve the problem of too large of a data amount in a single data node, there have been proposed technical solutions for vertically partitioning and horizontally partitioning multiple tables in a database. However, existing partition solutions are not adapted to various types of databases. For example, current technical solutions can only vertically partition databases that meet a specific relation (e.g., constrained tree schema CTS). Such additional constraint conditions greatly limit vertical partition.

However, as people's requirements on data management become constantly complicated, the database design also tends to get increasingly complicated. As a result, most of current databases do not conform to the requirement of CTS. Therefore, it is a focus of attention regarding how to get rid of these additional constraint conditions and enable partitioning of various types of databases.

SUMMARY

In one aspect, a method for partitioning a database includes obtaining business dependency between data in a plurality of tables in the database on the basis of a business process associated with the database; generating, on the basis of the business dependency, a dependency graph describing a dependency relationship between the plurality of tables; cutting the dependency graph into at least two sub-graphs; and vertically partitioning the database into at least two parts corresponding to the at least two sub-graphs respectively.

In another aspect, an apparatus for partitioning a database includes an obtaining module configured to obtain business dependency between data in a plurality of tables in the database on the basis of a business process associated with the database; a generating module configured to generate, on the basis of the business dependency, a dependency graph describing a dependency relationship between the plurality of tables; a cutting module configured to cut the dependency graph into at least two sub-graphs; and a partitioning module configured to vertically partition the database into at least two parts corresponding to the at least two sub-graphs respectively.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

In view of the above discussed drawbacks, it is desired to develop a technical solution capable of database partition, and it is desired that the technical solution can get rid of additional constraint conditions on to-be-partitioned databases and thus achieve database partition in a simple but convenient way.

In one embodiment of the present invention, there is provided a method for partitioning a database, including obtaining business dependency between data in a plurality of tables in the database on the basis of a business process associated with the database; generating, on the basis of the business dependency, a dependency graph describing a dependency relationship between the plurality of tables; cutting the dependency graph into at least two sub-graphs; and vertically partitioning the database into at least two parts corresponding to the at least two sub-graphs respectively.

In one embodiment of the present invention, there is provided an apparatus for partitioning a database, including an obtaining module configured to obtain business dependency between data in a plurality of tables in the database on the basis of a business process associated with the database; a generating module configured to generate, on the basis of the business dependency, a dependency graph describing a dependency relationship between the plurality of tables; a cutting module configured to cut the dependency graph into at least two sub-graphs; and a partitioning module configured to vertically partition the database into at least two parts corresponding to the at least two sub-graphs respectively.

With the method and apparatus of the present invention, additional constraint conditions on to-be-partitioned databases in the prior art may be eliminated, and a plurality of tables in the database may be partitioned into different parts.

Further, tables in these different parts may be stored in corresponding data nodes. Thereby, access requests with respect to the database may be guided to different data nodes, and further the database's response performance may be enhanced and the database's stable running ensured.

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
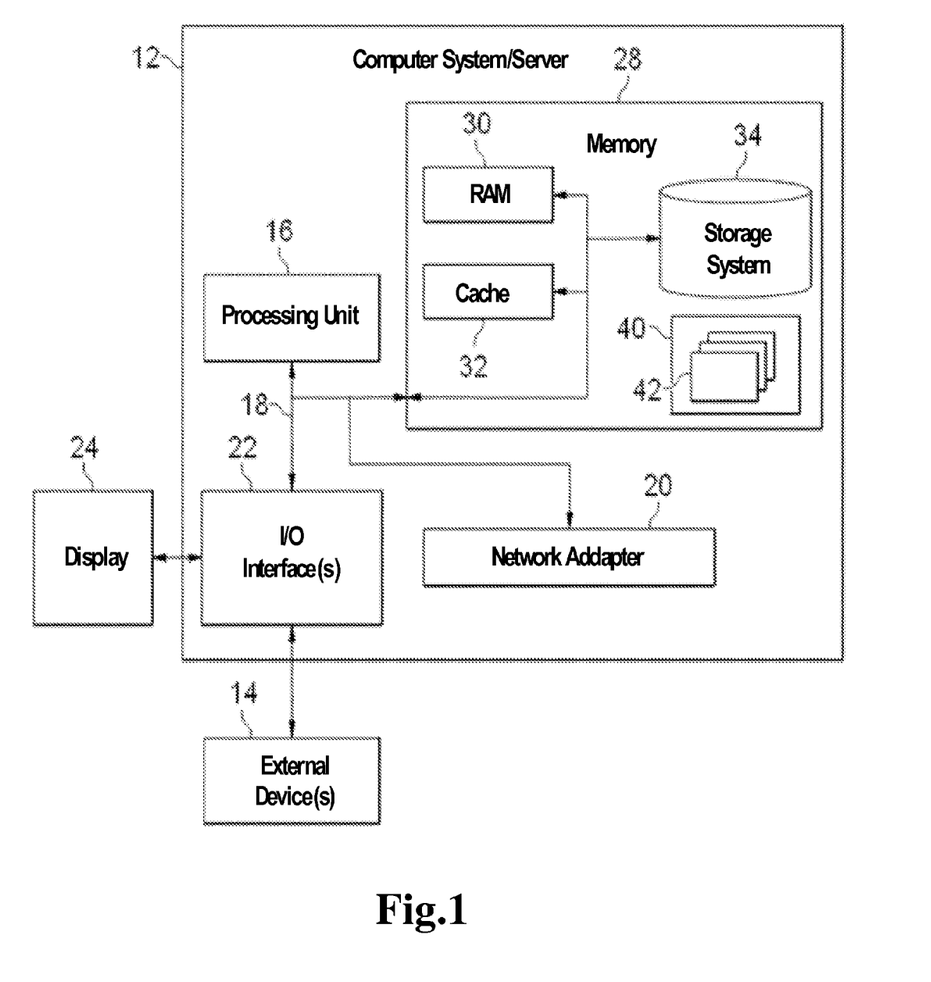
FIG. 1 schematically shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Database partition may include horizontal partition and vertical partition. Specifically, horizontal partition involves partitioning records in a table in a database into different parts. For example, suppose table Customer includes a plurality of fields such as customer ID, customer name and the like, and hundreds of records are stored in this table. To avoid storing millions of records in one data node, this table may be partitioned into two tables by customer ID (e.g., in even-odd manner), and these two tables are stored in different data nodes, so as to increase the database's response efficiency.

On the other hand, vertical partition may involve partitioning a plurality of tables in a database into a plurality of parts, and the plurality of tables are stored in different data nodes according to a partitioning result, so that the workload of each data node is balanced. In this way, the database's response efficiency can also be enhanced. Specifically, a database includes a table Customer recording customer information and a table Stock recording stock information of items.

Figure 2:
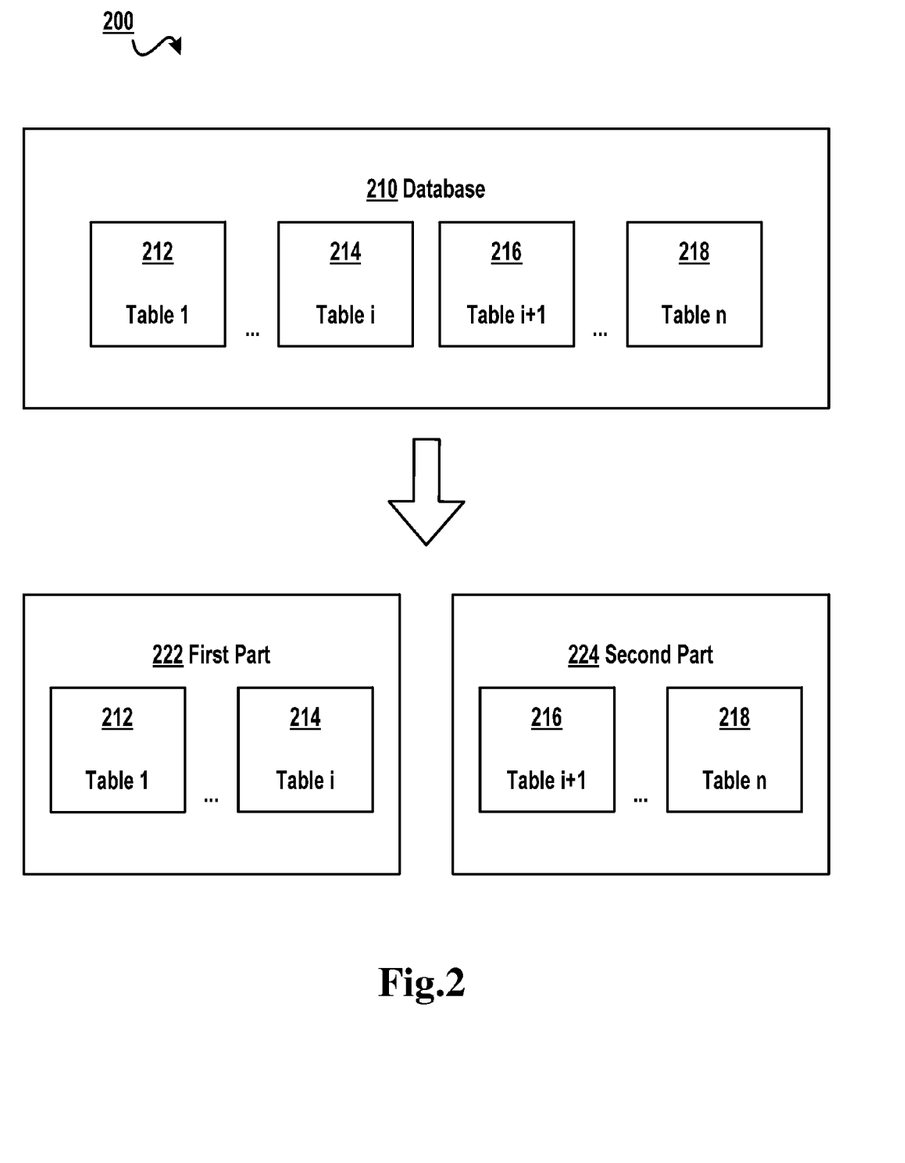
FIG. 2 schematically shows a block diagram of partitioning a database according to one embodiment of the present invention.

FIG. 2 schematically shows a block diagram 200 of database partition according to one embodiment of the present invention. As shown in FIG. 2, a database 210 may comprise a plurality of tables, such as a table 1 212, . . . , a table i 214, a table i+1 216, . . . , a table n 218. On the basis of principles of vertical partition, the database may be partitioned into two parts, i.e., a first part 222 and a second part 224, wherein first part 222 may comprise table 1 212 to table i 214, while second part 224 may comprise table i+1 216 to table n 218.

Although there have been proposed technical solutions for implementing vertical partition, these technical solutions have to satisfy additional constraint relations (e.g., satisfy a CTS constraint condition). Since most of current databases do not satisfy this constraint condition, these technical solutions cannot be used to vertically partition existing databases directly. In view of the foregoing drawbacks in the prior art, the present invention proposes a technical solution for partitioning a database on the basis of business dependency between in a plurality of tables. Note in the context of the present invention business dependency refers to business dependency between data in different tables.

For description convenience, various tables in the database will be defined by means of an online store in the context of the present invention. Specifically, the database may include various tables as shown in Table 1 below.

TABLE 1

Tables in Database

| No. | Name | Description |
| --- | --- | --- |
| 1 | Warehouse | warehouse information |
| 2 | District | district information where a warehouse is located |
| 3 | Customer | customer information |
| 4 | History | shopping history |
| 5 | Order | order information |
| 6 | NewOrder | new order information |
| 7 | OrderLine | information on order being executed |
| 8 | Item | item information |
| 9 | Stock | stock information |

Note the business process can reflect various operations (such as insertion, deletion, modification, etc.) performed to data in various tables in the database, and the database's response efficiency depends on the response efficiency with respect to these operations. Therefore, by analyzing the business process, it can be found in which tables the dependency relationship between data is stronger and in which tables the dependency relationship between data is weaker, and further on the basis of dependency relationships a more efficient partitioning approach is found so as to increase the data access efficiency.

Specifically, for example, it can be found, by analyzing the business process, that a value of a field "C_BALANCE (balance of account)" in the table Customer will decrease as a value of a field "OL_AMOUNT (quantity of order)" in a table OrderLine increases. This means that while or after updating the value of OL_AMOUNT, the value of C_BALANCE needs to be updated. At this point, if the tables Customer and OrderLine are partitioned to different parts and saved to two different data nodes, then an additional data synchronization operation has to be performed to the two data nodes. The data synchronization operation will cost considerable time and further prejudice the database's response efficiency. At this point, it may be considered the tables Customer and OrderLine have business dependency between them.

For another, by analyzing the business process it is found that operations are often performed to a table Order and the table OrderLine in the database concurrently (e.g., a statement "Select * from Order, OrderLine where . . . " frequently occurs in historical accesses), at which point it may also be considered the tables Order and OrderLine have business dependency.

According to principles of the present invention, if tables having business dependency are partitioned into the same part and stored to the same data node, then operations may be performed to these tables in the same data node with higher efficiency, thereby avoiding the additional time for synchronization between different data nodes.

Figure 3:
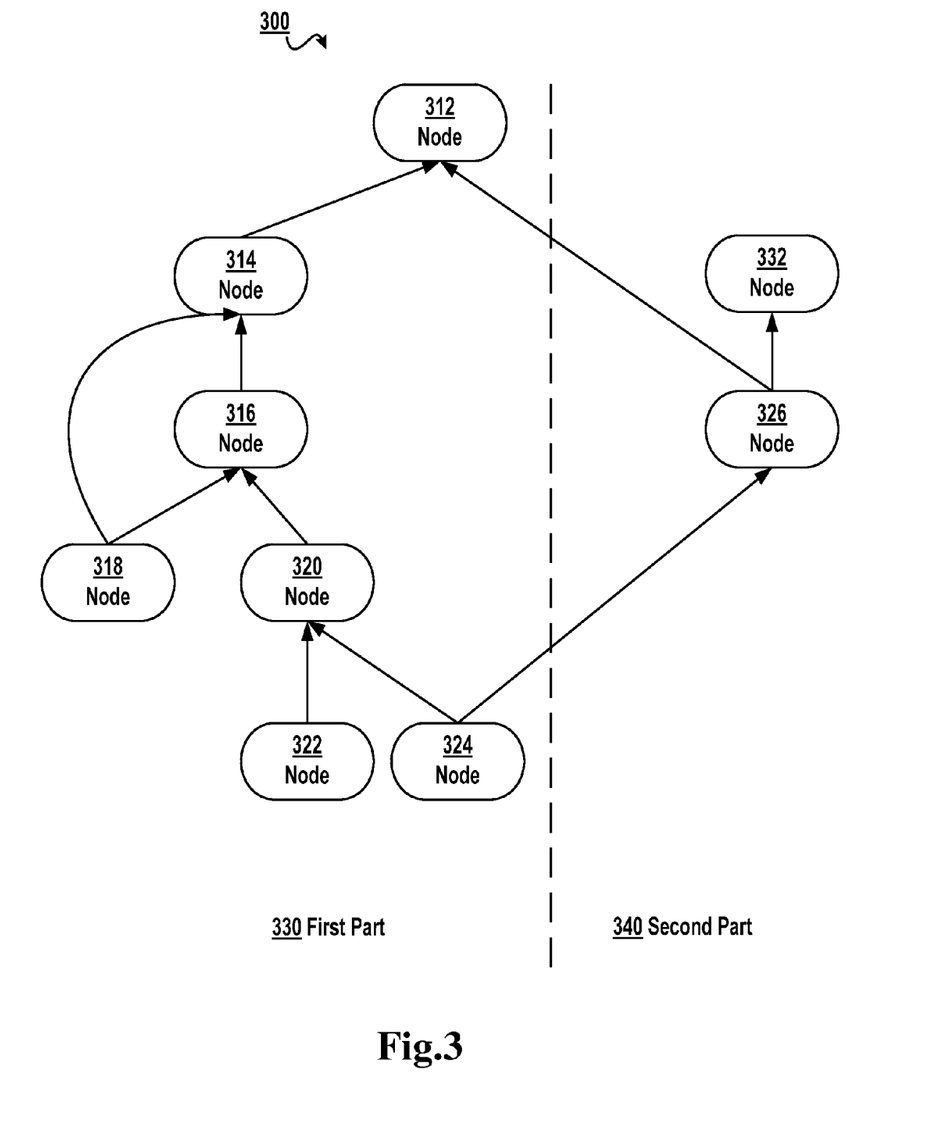
FIG. 3 schematically shows a block diagram of partitioning a database on the basis of a dependency graph associated with the database according to one embodiment of the present invention.

The present invention is now described with reference to FIG. 3. This figure schematically shows a block diagram 300 of partitioning a database on the basis of a dependency graph associated with the database according to one embodiment of the present invention. Specifically, business dependency between multiple tables in the database may be described by a dependency graph as shown in FIG. 3. In this figure, one node corresponds to one table in the database (e.g., a node 312 corresponds to a table WareHouse, a node 314 corresponds to a table District, etc.), and an edge between two nodes corresponds to business dependency between various tables in the database.

Subsequently, the dependency graph may be partitioned into two parts, namely a first part 330 and a second part 340, on the basis of the closeness of business dependency. Accordingly, tables corresponding to nodes in first part 330 may be partitioned to one part, and tables corresponding to nodes in second part 340 may be partitioned to another part, thereby achieving vertical partition of the database.

In one embodiment of the present invention, there is proposed a method for partitioning a database, comprising: obtaining business dependency between data in a plurality of tables in the database on the basis of a business process associated with the database; generating, on the basis of the business dependency a dependency graph describing a dependency relationship between the plurality of tables; cutting the dependency graph to at least two sub-graphs; and vertically partitioning the database into at least two parts corresponding to the at least two sub-graphs.

Figure 4:
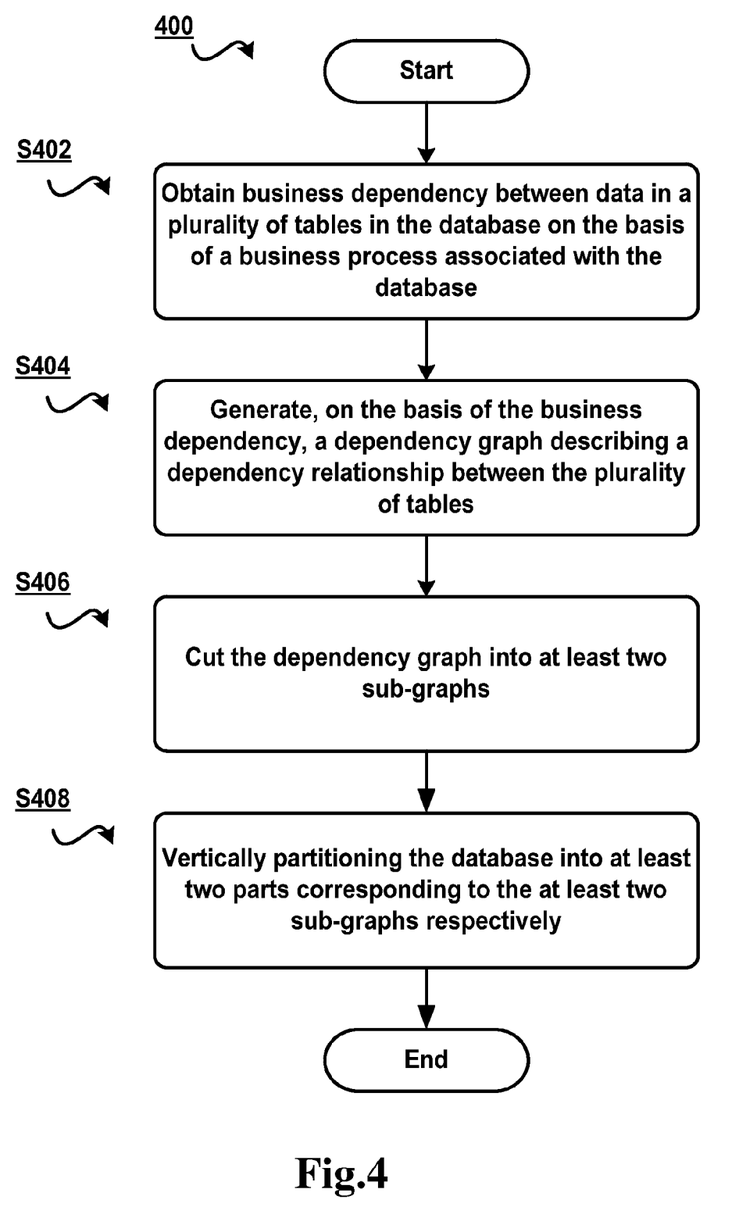
FIG. 4 schematically shows a flowchart of a method for partitioning a database according to one embodiment of the present invention.

Specifically, FIG. 4 schematically shows a flowchart 400 of a method for partitioning a database according to one embodiment of the present invention. As shown in FIG. 4, in operation S402 business dependency between data in a plurality of tables in the database is obtained on the basis of a business process associated with the database.

In one embodiment of the present invention, the business dependency may be obtained one after another on the basis of each process in the business process. Specifically, the business dependency may be obtained on the basis of operations to various tables in the database as triggered by each purchase action of a customer. For example, after the customer executes a purchase action, in the table Customer the account balance will decrease as the number of items increases; moreover, the higher the unit price of an item, the more rapidly the account balance decreases; the customer's credit rating will rise as the quantity of purchased items increases, etc. In a table Stock, the stock quantity will decrease as the quantity of order increases, etc. By traversing various links in the business process, the business dependency between data in the plurality of tables in the database may be obtained gradually.

In operation S404, a dependency graph describing a dependency relationship between the plurality of tables is generated on the basis of the business dependency. Since the business dependency between data in the plurality of tables has been obtained in operation S402, a dependency graph may be built on the basis of the business dependency and the plurality of tables in the database (e.g., as shown in FIG. 3).

In operation S406, the dependency graph is cut into at least two sub-graphs. In this operation, on the basis of a cutting algorithm in the graph theory, the dependency graph is cut into at least two sub-graphs and it is ensured the business dependency between tables corresponding to nodes in the two sub-graphs is as little as possible. Specifically, for example, it is found the tables Customer and Stock have no direct business dependency between them, and then these two tables may be included in different sub-graphs; for another example, if it is found the tables Customer and OrderLine have a close business dependency relationship, then these two tables may be included in the same sub-graph.

In operation S408, the database is vertically partitioned into at least two parts corresponding to the at least two sub-graphs respectively. Where the dependency graph has been cut into two sub-graphs on the basis of the business dependency between various tables in operation S406, the database may be vertically partitioned according to contents in each sub-graph. Returning to FIG. 3, tables corresponding to nodes 312-314 may be partitioned to first part 330, and tables corresponding to nodes 332 and 326 may be partitioned to the same second part 340.

In one embodiment of the present invention, the business dependency describes a dependency relationship between a first field of a first table among the plurality of tables and a second field of a second table among the plurality of tables. Note a table in the database may comprise a plurality of fields. Therefore, the business dependency between data in the plurality of tables may be embodied as a dependency relationship between fields in various tables.

Note although in the context of the present invention, the first table and the second table represent two tables and the first field and the second field represent two fields, the "first" and "second" are not intended to limit a sequential order. On the contrary, the first table and the second table represent two different tables, and the first field and the second field represent two different fields in two different tables.

In the example as described above, for example, the business dependency between the tables Customer and OrderLine is embodied as business dependency between the field "C_BALANCE (balance of account)" in the table Customer and the field "OL_AMOUNT (quantity of order)" in the table OrderLine, i.e., a value of the field "C_BALANCE" in the table Customer will decrease as a value of the field "OL_AMOUNT" in the table OrderLine increases.

In one embodiment of the present invention, the obtaining business dependency between data in a plurality of tables in the database on the basis of a business process associated with the database comprises: extracting from a schema of the database a reference relation between the first field and the second field as the dependency relationship.

Figure 5:
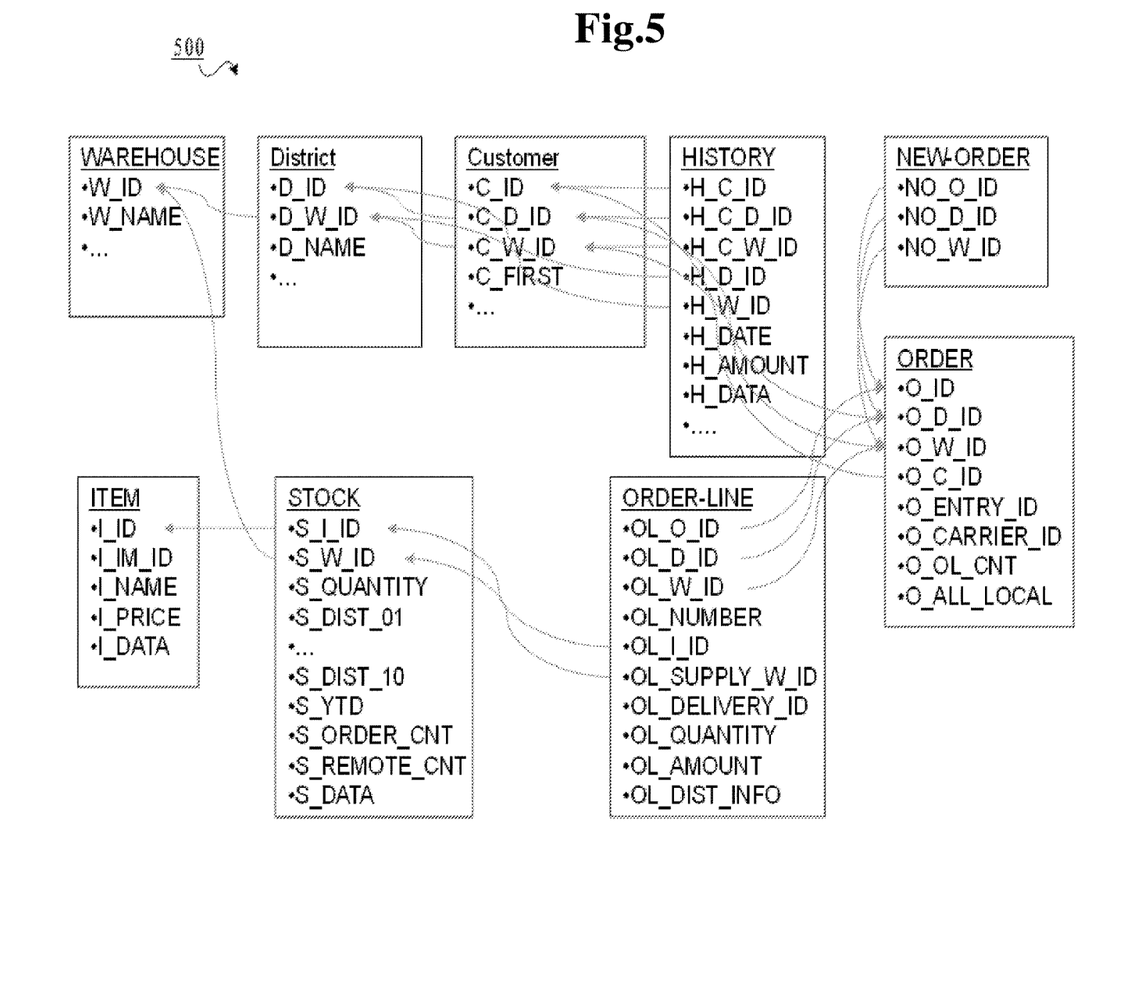
FIG. 5 schematically shows a block diagram of reference relations between a plurality of tables in a database according to one embodiment of the present invention.

FIG. 5 schematically shows a block diagram 500 of reference relations between the plurality of tables in the database according to one embodiment of the present invention. As shown in a table WareHouse in the top left corner of FIG. 5, a field W_ID (warehouse ID) is a main key of this table. In a table District, a field D_ID (district ID) is a main key, and the table District further includes a field D_W_ID (warehouse ID). Although the two fields D_W_ID and W_ID are differently named in the two tables, they both represent warehouse ID. At this point, it is considered there is a reference relation between the field D_W_ID in the table District and the field D_ID in the table WareHouse. Those skilled in the art may understand according to definition of main key and foreign key in the database technology, a main key—foreign key relation belongs to reference relations in the present invention. Those skilled in the art may extract reference relations from a schema of the database. For example, arrows between various tables in FIG. 5 represent reference relations between various fields.

In one embodiment of the present invention, the obtaining business dependency between data in a plurality of tables in the database on the basis of a business process associated with the database comprises: analyzing the business process to extract an impact relationship between a first data item of the first field and a second data item of the second field as the dependency relationship.

In the context of the present invention, the impact relationship may refer to an impact relationship between values of data items of different fields in two tables. For example, if the value of the field "C_BALANCE" (balance of account) in the table Customer will decrease as the value of the field "OL_AMOUNT" (quantity of order) in the table OrderLine increases, then these two fields have an impact relationship, and the impact belongs to "negative" impacts (denoted by "−"). For another, if a value of a field "S_QUANTITY" (quantity of stock) in the table Stock will decrease as a value of a field "OL_QUANTITY" (total quantity of order) in the table OrderLine increases, then the two fields have an impact relationship, and this impact also belongs to "negative" impacts (denoted by "−").

Although concrete examples of the impact relationship are illustrated above by means of "negative" impacts, those skilled in the art may understand "positive" impacts may further be included. For example, suppose there further exists a table SaleInfo about sale information, then a field "SI_QUANTITY" (quantity of sale) in this table may increase as the value of the field "OL_QUANTITY" (total quantity of order) in the table OrderLine increases. At this point, these two fields have an impact relationship, and the impact belongs to "positive" impacts (denoted by "+").

Note examples of the impact relationship are illustrated above where field types are real numbers. However, those skilled in the art should understand field types may be various types, e.g., including without limitation integers, real numbers, characters, character strings, vectors, enumerates, sets and other types. Those skilled in the art may define corresponding "impact relationships" with respect to different types according to the above principle. Generally speaking, as long as a data item in one field changes as a data item in another field changes, it may be considered these two fields have an impact relationship. According to the principle described above, those skilled in the art may further analyze various circumstances in the business process, so as to find impact relationships between fields in various tables in the database.

In one embodiment of the present invention, the obtaining business dependency between data in a plurality of tables in the database on the basis of a business process associated with the database comprises: extracting, from historical accesses to the database, access correlation that the first table and the second table are jointly accessed as the dependency relationship.

The purpose of building a database is to satisfy people's demand for data management through accesses to the database (such as insertion, deletion, modification and other operation). Therefore, the access to a database is one of important respects in the business process associated with the database. Generally speaking, the database may be accessed by the Structured Query Language (SQL). In one embodiment of the present invention, access history of accessing the database in a specific time period may be monitored so as to learn which tables in the database the user prefers to access. For example, in the access history there may exist SQL statements as below:

(1) Select * from order, orderline where order.id=line.oid and order.id=111

(2) Select * from customer, order where order.id=line.oid and order.id=111

(3) Select * from order, orderline where order.id=line.oid and order.id=111

As seen from the statement (1), the tables Order and OrderLine are jointly accessed; as seen from the statement (2), the tables Customer and Order are jointly accessed; and as seen from the statement (3), the tables Order and OrderLine are jointly accessed. Therefore, the access correlation between various tables may be defined by making statistics on the number of joint accesses to various tables and on the basis of the number.

Although the foregoing example of SQL statements show only two tables in the database are jointly accessed, in the business process there might further exist circumstances where a plurality of tables in the database are jointly accessed. In addition, although the access correlation is calculated on the basis of the number of joint accesses above, those skilled in the art may define concrete calculation methods for access correlation as specific environments demand.

Detailed description has been presented above to that the dependency relationships may comprise at least one of the impact relationship, reference relation and access correlation. Hereinafter, detailed description will be presented to how to obtain final business dependency on the basis of various types of dependency relationships.

Figure 6A:
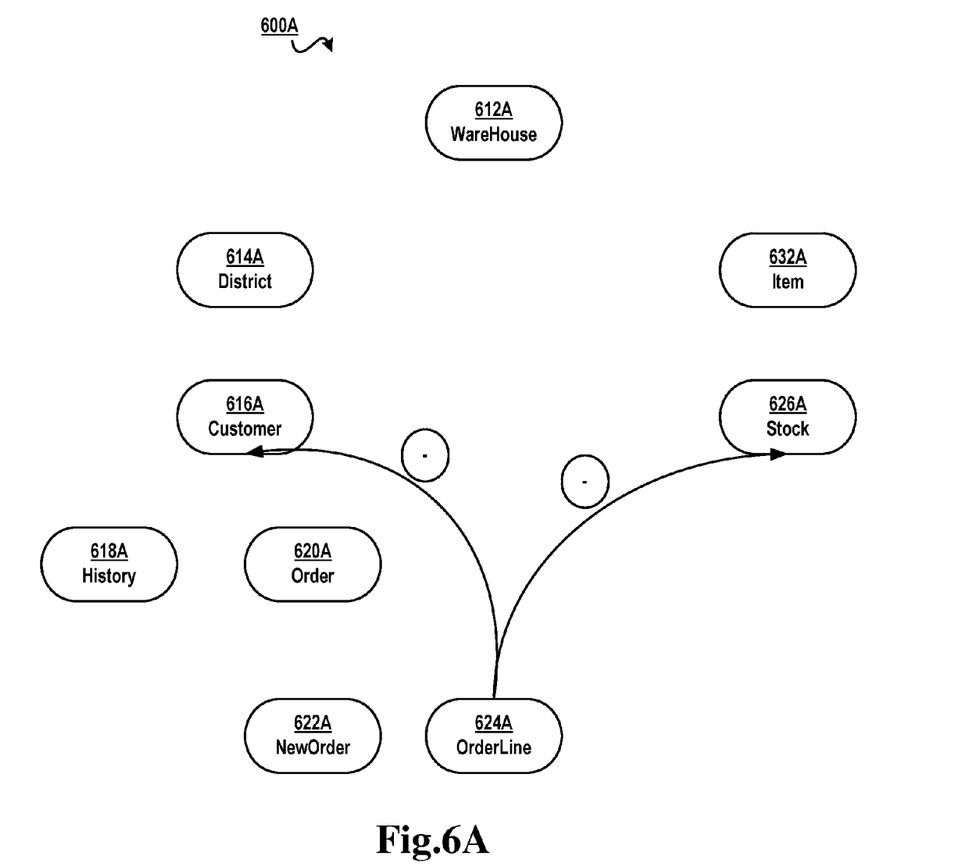
FIGS. 6A, 6B, and 6C schematically show dependency graphs that are built on the basis of an impact relationship, a reference relation and access correlation between various tables according to one embodiment of the present invention, respectively.
Figure 6B:
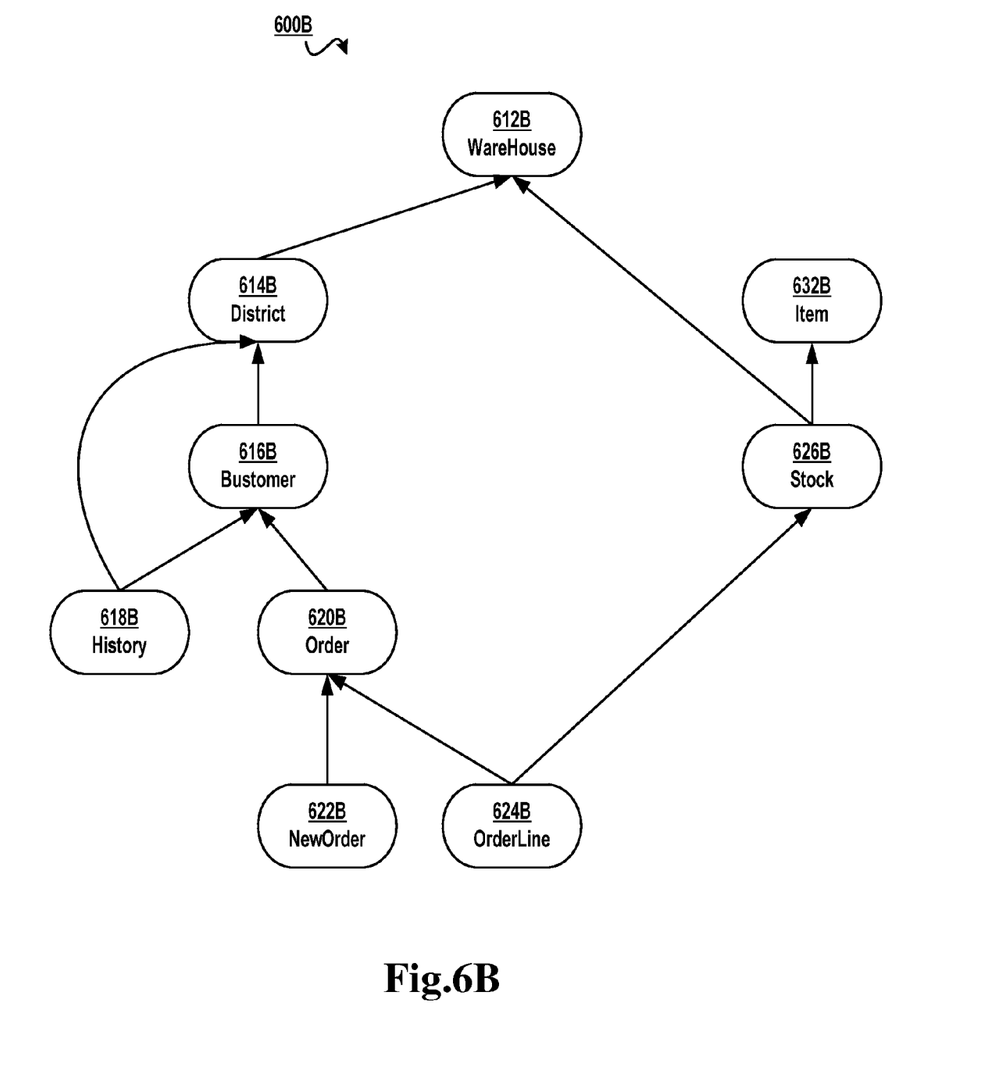
Figure 6C:
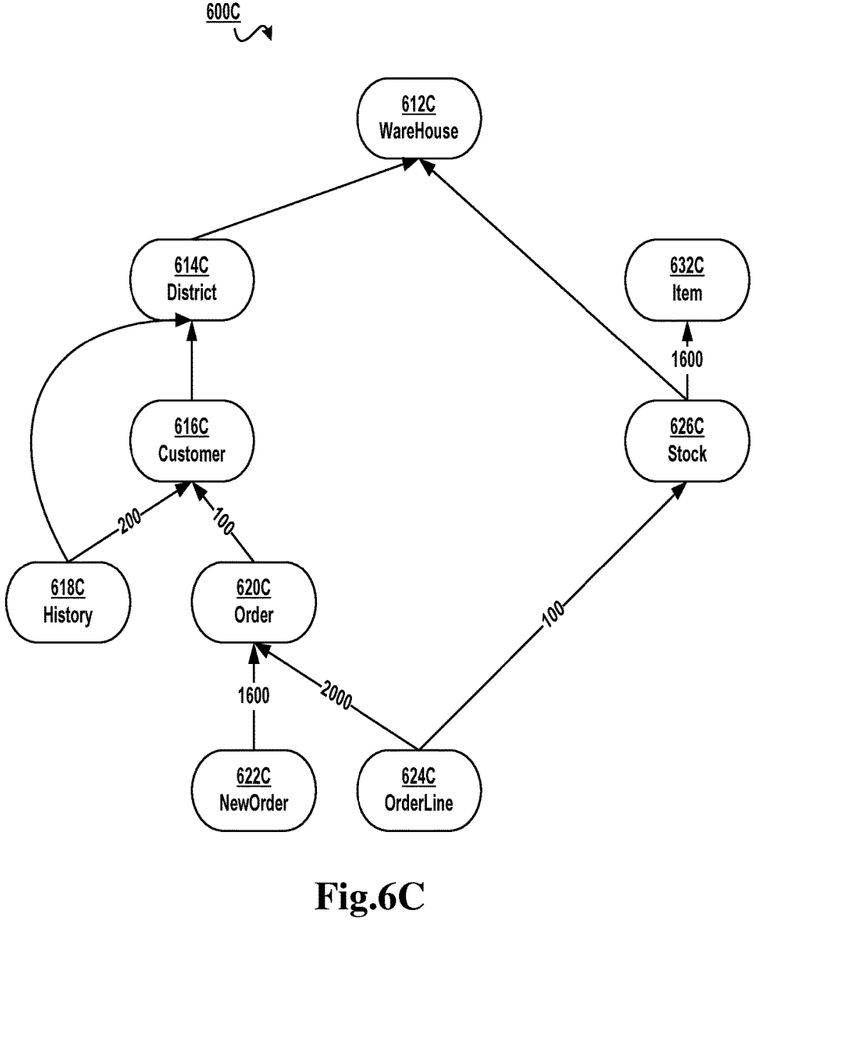

Specifically, FIGS. 6A-6C schematically show dependency graphs 600A-600C that are built on the basis of an impact relationship, a reference relation and access correlation between various tables according to one embodiment of the present invention. Using the method described above, the dependency graph may be built on the basis of various types of dependency relationships. In one embodiment of the present invention, nodes in the dependency graph describe the plurality of tables, and a weight of an edge in the dependency graph describes the business dependency.

With reference to FIG. 6A now, this figure shows a dependency graph that is built on the basis of an impact relationship between various tables according to one embodiment of the present invention. Continuing the foregoing example, if it is found the field "C_BALANCE" (account balance) in the table Customer and the field "OL_AMOUNT" (quantity of order) in the table OrderLine have a "negative" impact relationship, then as shown in FIG. 6A a directed edge may be added between nodes OrderLine 624A and Customer 616A in dependency graph 600A and is denoted by "-." If it is found the field "S_QUANTITY" (stock quantity) in the table Stock and the field "OL_QUANTITY" (total quantity of order) in the table OrderLine have a negative impact relationship, then a directed edge may be added between nodes OrderLine 624A and Stock 626A in dependency graph 600A and is denoted by "-."

In this manner, the impact relationship between various fields in various tables of the database may be obtained by analyzing various links in the business process. In one embodiment of the present invention, whether the impact relationship is strong or weak may be denoted by a value, e.g., a weight may be assigned to a directed edge representing the impact relationship. For example, suppose the tables Customer and OrderLine have two impact relationships, then a weight "2" may be assigned to the directed edge as shown in FIG. 6A.

With reference to FIG. 6B now, this figure shows a dependency graph that is built on the basis of a reference relation between various tables according to one embodiment of the present invention. As shown in FIG. 6B, a reference relation between various fields of various tables may be extracted from a schema of the database. For example, a directed edge between nodes District 614B and WareHouse 612B may represent: a main key-foreign key relation between the field W_ID (warehouse ID) of the table WareHouse and the field D_ID (district ID) of the table District.

Note the reference relation between two tables is not limited to a one-to-one reference relation, but two tables may further contain a multi-to-multi reference relation. For example, a reference relation exists between a field A1 in a table A and a field B1 in a table B, and a reference relation exists between meanwhile a field A2 in the table A and a field B2 in the table B, then at this point 2 reference relations exist between the tables A and B.

Those skilled in the art may define a concrete calculation equation for the reference relation according to needs to a concrete application environment, for example, weight a multi-to-multi reference relation. In one embodiment of the present invention, whether the reference relation is strong or weak may be denoted by a value, for example, a weight may be assigned to a directed edge representing the impact relationship.

With reference to FIG. 6C now, this figure shows a dependency graph that is built on the basis of access correlation between various tables according to one embodiment of the present invention. According to the method described above, the number that various tables are jointly accessed may be obtained by analyzing SQL statements in historical access, and further the access correlation may be obtained. As shown in FIG. 6C, a directed edge between nodes OrderLine 624C and Order 620C may represent the tables OrderLine and Order are jointly accessed, and the number of joint accesses within a specific time period is 2000.

Although the number of accesses is used as a concrete example of the access correlation throughout the context of the present invention, those skilled in the art may further use other approach to representing the access correlation. For example, different weights are assigned with respect to access from different users, different weights are assigned with respect to access at different time, etc. In this manner, the dependency graph as shown in FIG. 6C may be obtained.

Figure 7:
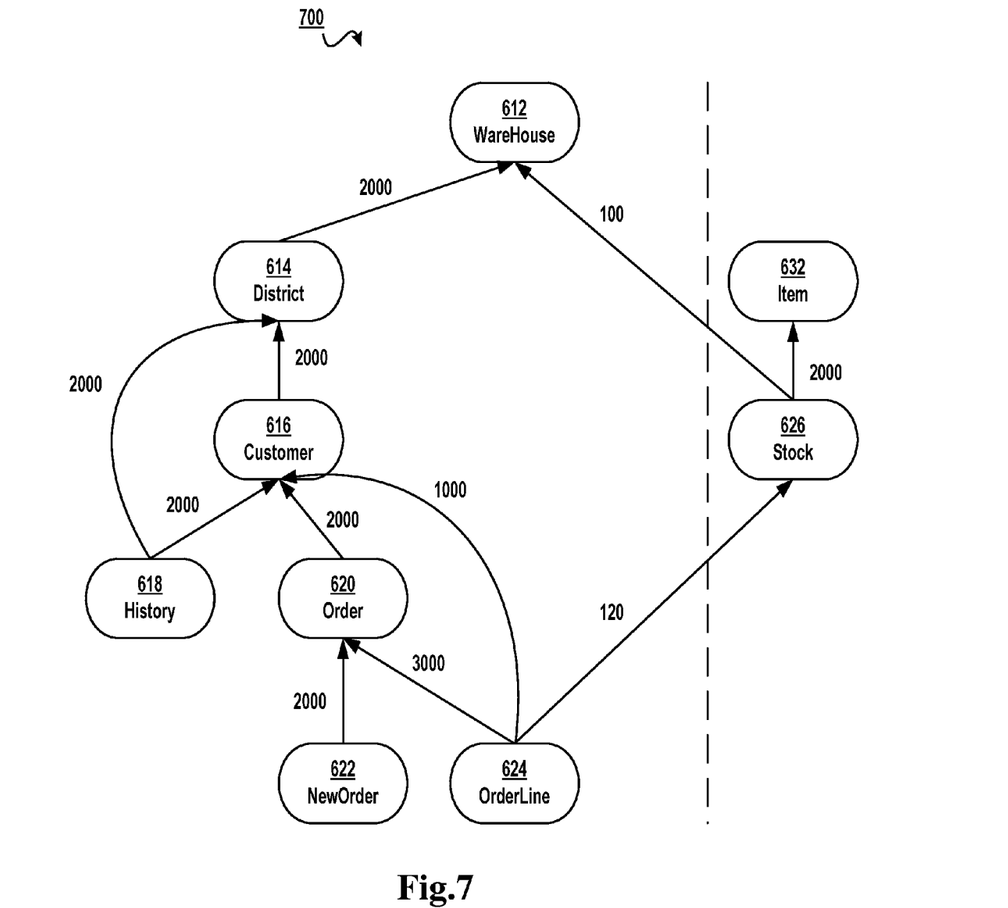
FIG. 7 schematically shows a block diagram of generating a dependency graph on the basis of the dependency graphs shown in FIGS. 6A-6C and cutting the generated dependency graph.

With reference to FIGS. 6A-6C above, description has been presented to how to describe the impact relationship, reference relation and access correlation in value form. In subsequent processing, the dependency graphs as shown in FIGS. 6A-6C may overlap, whereby a dependency graph as shown in FIG. 7 is obtained. In one embodiment of the present invention, the business dependency between various tables may be calculated on the basis of the impact relationship, reference relation and access correlation. For example, weighted summation may be implemented on the basis of the importance of each respect, and a final value is used as a weight of each node. Specifically, an equation below may be used:

$$\text{business-dependency}(i,j) = \alpha \cdot \text{impactrelationship}(i,j) + \beta \cdot \text{referencerelationship}(i,j) + \gamma \cdot \text{accesscorrelation}(i,j)$$

FIG. 7 schematically shows a block diagram 700 of generating a dependency graph on the basis of dependency graphs shown in FIGS. 6A-6C and cutting the generated dependency graph. Note in FIG. 7 weights between various nodes are only for the illustration purpose, and those skilled in the art may use other equation to calculate the business dependency between data in a plurality of tables, on the basis of the foregoing algorithm.

Note although the example of obtaining a dependency relationship between various tables on the basis of an impact relationship, a reference relation and access correlation these three respects has been illustrated above with reference to FIG. 7, according to other embodiments of the present invention, a dependency relationship may further be obtained on the basis of two respects. For example, a dependency relationship may be obtained on the basis of an impact relationship and a reference relation, or an impact relationship and access correlation, or a reference relation and access correlation.

In one embodiment of the present invention, the cutting the dependency graph into at least two sub-graphs comprises: cutting the dependency graph into at least two sub-graphs by a minimum cutting algorithm on the basis of the weight of the edge. Those skilled in the art may cut the dependency graph on the basis of various algorithms in the graph theory. Specifically, the dependency graph in FIG. 7 may be represented in matrix form. For example, each element A(i,j) in a matrix A may represent a weight of an edge between a node i and a node j; for nodes i and j without a connection relation, a value of the element A(i,j) equals "0". Subsequently, cutting may be implemented by an eigen decomposition method on the basis of the graph theory. Those skilled in the art may implement cutting on the basis of principles of the minimum cutting algorithm in the prior art, which will not be detailed in the context of the present invention.

As shown in FIG. 7, the dependency graph may be partitioned into two sub-graphs by the minimum cutting algorithm, and then the database may be horizontally partitioned on the basis of the two sub-graphs. For example, the tables Item and Stock in the database are partitioned to one part, while the remaining tables are partitioned to another part.

Note although how to partition the plurality of tables in the database into two parts has been illustrated above by means of a concrete example, the method of the present invention may be implemented iteratively on the basis of the principle of the present invention. For example, minimum cutting may be implemented with respect to each sub-graph, or other cutting algorithm may be used to partition the dependency graph into a plurality of parts.

In one embodiment of the present invention, there is further comprised: vertically partitioning tables in the at least two parts. By the foregoing concrete operations, the database comprising the plurality of tables may be vertically partitioned into a plurality of parts. Within each part resulting from the partitioning, vertical partition may be implemented.

For example, with respect to a part corresponding to the left sub-graph as shown in FIG. 7, when the number of customers in the table Customer is so great that one data node can hardly handle access requests, customer information may be saved in two tables on the basis of C_ID (customer ID). For example, one table is for saving information of users whose customer IDs are odd numbers, and the other table is for saving information of users whose customer IDs are even numbers.

In one embodiment of the present invention, there is further comprised: storing the at least two parts of the database to different data nodes. The purpose of vertically partitioning the database is to store various parts resulting from the partitioning to different data nodes, so that these data nodes may jointly handle access requests. In this manner, the database's response time may be shortened and further the database's access performance improved.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing operations in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding operations. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8:
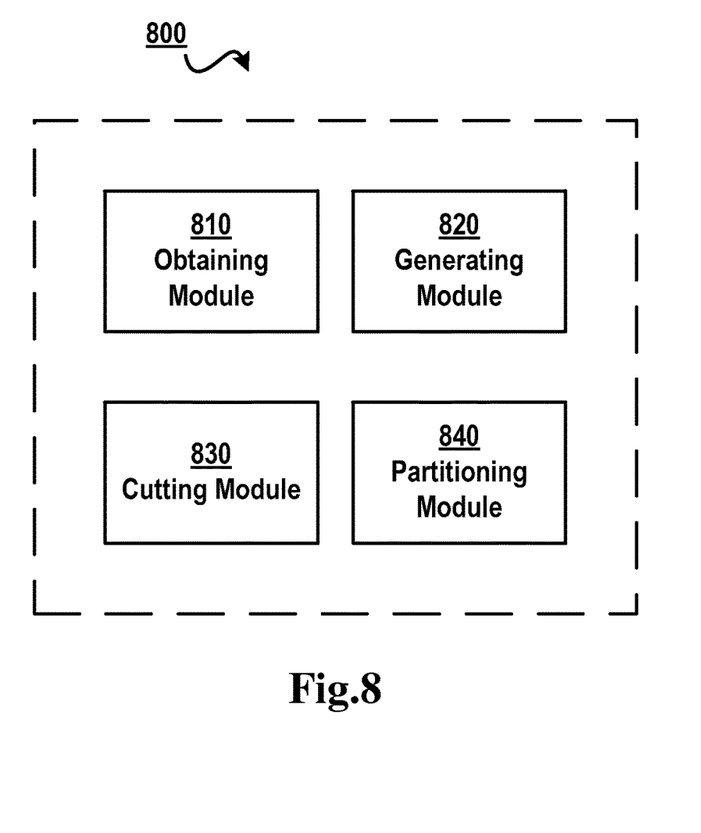
FIG. 8 schematically shows a block diagram of an apparatus for partitioning a database according to one embodiment of the present invention.

FIG. 8 shows a block diagram 800 of an apparatus for vertically partitioning a database according to one embodiment of the present invention. As shown in FIG. 8, there is provided an apparatus for partitioning a database, comprising: an obtaining module 810 configured to obtain business dependency between data in a plurality of tables in the database on the basis of a business process associated with the database; a generating module 820 configured to generate, on the basis of the business dependency, a dependency graph describing a dependency relationship between the plurality of tables; a cutting module 830 configured to cut the dependency graph into at least two sub-graphs; and a partitioning module 840 configured to vertically partition the database into at least two parts corresponding to the at least two sub-graphs respectively.

In one embodiment of the present invention, the business dependency describes a dependency relationship between a first field of a first table among the plurality of tables and a second field of a second table among the plurality of tables.

In one embodiment of the present invention, obtaining module 810 comprises: a first obtaining module configured to analyze the business process to extract an impact relationship between a first data item of the first field and a second data item of the second field as the dependency relationship.

In one embodiment of the present invention, obtaining module 810 comprises: a second obtaining module configured to extract from a schema of the database a reference relation between the first field and the second field as the dependency relationship.

In one embodiment of the present invention, the dependency relationship is access correlation that the first table and the second table, and obtaining module 810 comprises: a third obtaining module configured to extract, from historical accesses to the database, access correlation that the first table and the second table are jointly accessed as the dependency relationship.

In one embodiment of the present invention, nodes in the dependency graph describe the plurality of tables, and a weight of an edge in the dependency graph describes the business dependency.

In one embodiment of the present invention, cutting module 830 comprises: a minimum cutting module configured to cut the dependency graph into at least two sub-graphs by a minimum cutting algorithm on the basis of the weight of the edge.

In one embodiment of the present invention, there is further comprised: a second partitioning module configured to horizontally partition tables in the at least two parts.

In one embodiment of the present invention, there is further comprised: a storing module configured to store the at least two parts of the database to different data nodes.

With the method and apparatus of the present invention, additional constraint conditions on to-be-partitioned databases in the prior art may be eliminated, and a plurality of tables in the database may be partitioned into different parts. Further, tables in these different parts may be stored in corresponding data nodes, and thus the database's response performance enhanced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for partitioning a database, comprising:
    an obtaining module configured to obtain business dependency between data in a plurality of tables in the database on the basis of a business process associated with the database, wherein the business dependency is obtained by traversing one or more links associated with the business process and is based on at least one of: an impact relationship, reference relation and access correlation;
    a generating module configured to generate, on the basis of the business dependency, a dependency graph describing a dependency relationship between the plurality of tables;
    a cutting module configured to cut the dependency graph into at least two sub-graphs using a cutting algorithm, wherein the cutting algorithm cuts the dependency graph into the at least two sub-graphs to minimize the business dependency between tables corresponding to nodes in the at least two sub-graphs; and
    a partitioning module configured to vertically partition the database into at least two parts corresponding to the at least two sub-graphs respectively.

2. The apparatus of claim 1, wherein the business dependency describes a dependency relationship between a first field of a first table among the plurality of tables and a second field of a second table among the plurality of tables.

3. The apparatus of claim 2, wherein the obtaining module comprises a first obtaining module configured to analyze the business process to extract an impact relationship between a first data item of the first field and a second data item of the second field as the dependency relationship.

4. The apparatus of claim 2, wherein the obtaining module comprises a second obtaining module configured to extract from a schema of the database a reference relation between the first field and the second field as the dependency relationship.

5. The apparatus of claim 2, wherein the dependency relationship is access correlation that the first table and the second table, and the obtaining module comprises a third obtaining module configured to extract, from historical accesses to the database, access correlation that the first table and the second table are jointly accessed as the dependency relationship.

6. The apparatus of claim 1, wherein nodes in the dependency graph describe the plurality of tables, and a weight of an edge in the dependency graph describes the business dependency.

7. The apparatus of claim 6, wherein the cutting module comprises a minimum cutting module configured to cut the dependency graph into at least two sub-graphs by a minimum cutting algorithm on the basis of the weight of the edge.

8. The apparatus of claim 1, further comprising a second partitioning module configured to horizontally partition tables in the at least two parts.

9. The apparatus of claim 1, further comprising a storing module configured to store the at least two parts of the database to different data nodes.

10. The apparatus of claim 1, wherein the business dependency relationship minimizes an amount of tables per sub-graph.

11. The apparatus of claim 1, wherein the business process reflects a plurality of operations performed on data in a plurality of tables in the database.

12. The apparatus of claim 11, wherein the plurality of operations include insertions, deletions, and modifications to the data.

13. The apparatus of claim 1, further comprising an analysis module to identify tables having a stronger dependency relationship for data associated with a table and tables having a weaker dependency relationship for data associated with a table to determine where a cut the dependency graph should occur.

14. The apparatus of claim 1, wherein the access correlation is calculated on a basis of a number of joint accesses between a first table and a second table.

15. The apparatus of claim 1, wherein the reference relationship is a one-to-one reference relation or a multi-to-multi reference relation.

16. The apparatus of claim 15, wherein the reference relationship is a value associated with a weight assigned to a directed edge representing the impact relationship.

17. The apparatus of claim 1, wherein the business dependency is a weighted summation of the impact relationship, reference relation and access correlation.

18. The apparatus of claim 1, wherein the impact relationship is a positive relationship or negative relationship between a first table and a second table.

19. The apparatus of claim 1, wherein the impact relationship is a relationship associated with a value in data field of a first table and a value in data field of a second table.

* * * * *